US008827239B2

(12) United States Patent
Chen

(10) Patent No.: US 8,827,239 B2
(45) Date of Patent: Sep. 9, 2014

(54) TOUCH-FREE AUTOMATIC FAUCET

(71) Applicant: Chung-Chia Chen, La Habra Heights, CA (US)

(72) Inventor: Chung-Chia Chen, La Habra Heights, CA (US)

( * ) Notice: Subject to any disclaimer, the term of this patent is extended or adjusted under 35 U.S.C. 154(b) by 0 days.

(21) Appl. No.: 13/862,254

(22) Filed: Apr. 12, 2013

(65) Prior Publication Data

US 2013/0228226 A1 Sep. 5, 2013

Related U.S. Application Data

(63) Continuation of application No. 12/714,443, filed on Feb. 27, 2010, now Pat. No. 8,418,993.

(60) Provisional application No. 61/300,781, filed on Feb. 2, 2010.

(51) Int. Cl.
| F16K 31/02 | (2006.01) |
| E03C 1/04 | (2006.01) |
| E03C 1/05 | (2006.01) |
| F16K 11/00 | (2006.01) |

(52) U.S. Cl.
CPC . *E03C 1/04* (2013.01); *E03C 1/057* (2013.01); *F16K 19/006* (2013.01)
USPC .......................... 251/129.04; 4/623; 700/282

(58) Field of Classification Search
USPC ........... 251/129.04; 4/302–305, 623; 700/282
See application file for complete search history.

(56) References Cited

U.S. PATENT DOCUMENTS

| D315,397 S | 3/1991 | Knapp |
| D317,971 S | 7/1991 | Sauter et al. |
| D352,095 S | 11/1994 | Bollenbacher |
| 5,548,119 A | 8/1996 | Nortier |
| 5,549,273 A | 8/1996 | Aharon |
| 5,694,653 A | 12/1997 | Harald |
| 5,868,311 A | 2/1999 | Cretu-Petra |
| 5,966,753 A | 10/1999 | Gauthier et al. |
| 6,019,130 A | 2/2000 | Rump |
| 6,298,875 B1 | 10/2001 | Warshawsky et al. |
| 6,321,785 B1 | 11/2001 | Bergmann |

(Continued)

OTHER PUBLICATIONS

Notification of Transmittal of the International Search Report and the Written Opinion of the International Searching Authority for International Patent Application No. PCT/US2010/050146, Filed on Sep. 24, 2010 (Mailing Date Nov. 22, 2010).

(Continued)

*Primary Examiner* — Eric Keasel
*Assistant Examiner* — Ian Paquette
(74) *Attorney, Agent, or Firm* — Knobbe Martens Olson & Bear LLP

(57) ABSTRACT

A system and method of Touch Free Automatic faucet controlled by electronic sensors provides a Primary-Water-Flow-Mode, a Continue-Water-Flow-Mode, a Temperature-Control-Mode, a Faucet-Pause-Mode, an Adjust-Water-Flow-Mode and a Flow-Temperature-Default-Setting-Mode for users to control faucet water flow and water temperature without touching any parts of faucet body. The system comprises at least three electronic sensors, a logical processor circuit board, an electricity power supply package, a water flow control valve assembly, a temperature control valve assembly, at least one faucet body housing and at least one inlet fluid line. From the outputs of the sensors, the logical processor responds to the flow control valve assembly and to the temperature control valve assembly to control water flow and temperature to the faucet spout.

21 Claims, 8 Drawing Sheets

(56) References Cited

U.S. PATENT DOCUMENTS

| | | |
|---|---|---|
| 6,513,787 B1 | 2/2003 | Jeromson et al. |
| 6,598,245 B2 | 7/2003 | Nishioka |
| 6,753,554 B1 | 6/2004 | Gomes et al. |
| 6,996,863 B2 | 2/2006 | Kaneko |
| D516,675 S | 3/2006 | Kakihana |
| 7,107,631 B2 | 9/2006 | Lang et al. |
| 7,134,451 B1 | 11/2006 | Malapanes |
| D534,622 S | 1/2007 | Chu et al. |
| D535,366 S | 1/2007 | Sedwick |
| 7,174,577 B2 | 2/2007 | Jost et al. |
| 7,228,874 B2 | 6/2007 | Bolderheij et al. |
| 7,326,334 B2 | 2/2008 | Boyd et al. |
| D592,286 S | 5/2009 | Berberet |
| D602,125 S | 10/2009 | Montgomery et al. |
| D610,653 S | 2/2010 | Schoenherr et al. |
| 7,784,481 B2 | 8/2010 | Kunkel |
| 7,946,504 B2 | 5/2011 | Shapira et al. |
| 8,006,712 B2 | 8/2011 | Boey |
| D677,366 S | 3/2013 | Chen |
| D677,367 S | 3/2013 | Chen |
| 8,418,993 B2 | 4/2013 | Chen |
| D689,596 S | 9/2013 | Chen |
| D692,110 S | 10/2013 | Chen |
| D698,013 S | 1/2014 | Chen |
| D701,947 S | 4/2014 | Chen |
| D704,311 S | 5/2014 | Chen |
| 2006/0016902 A1 | 1/2006 | Restivo, Sr. et al. |
| 2007/0057215 A1 | 3/2007 | Parsons et al. |
| 2007/0170384 A1 | 7/2007 | Goodman |
| 2007/0239143 A1 | 10/2007 | Altshuler et al. |
| 2008/0156017 A1 | 7/2008 | Johnson et al. |
| 2008/0256494 A1 | 10/2008 | Greenfield |
| 2008/0271238 A1 | 11/2008 | Reeder et al. |
| 2009/0014654 A1 | 1/2009 | Zhevelev et al. |
| 2009/0056011 A1 | 3/2009 | Wolf et al. |
| 2009/0119832 A1 | 5/2009 | Conroy |
| 2009/0288712 A1 | 11/2009 | Lang et al. |
| 2010/0108165 A1 | 5/2010 | Rodenbeck et al. |
| 2011/0185493 A1 | 8/2011 | Chen |
| 2011/0186161 A1 | 8/2011 | Chen |
| 2012/0055557 A1* | 3/2012 | Belz et al. ............ 137/1 |
| 2014/0076407 A1 | 3/2014 | Chen |

OTHER PUBLICATIONS

Notification of Transmittal of the International Search Report and the Written Opinion of the International Searching Authority for International Patent Application No. PCT/US2011/22207, Filed on Jan. 24, 2011 (Mailing Date May 25, 2011).

Notification of Transmittal of the International Search Report and the Written Opinion of the International Searching Authority for International Patent Application No. PCT/US2011/023488, Filed on Feb. 2, 2011 (Mailing Date Apr. 12, 2011).

U.S. Appl. No. 29/479,788, filed Jan. 2014, Chen.
U.S. Appl. No. 13/843,148, filed Mar. 2013, Chen.
U.S. Appl. No. 29/453,289, filed Apr. 2013, Chen.

* cited by examiner

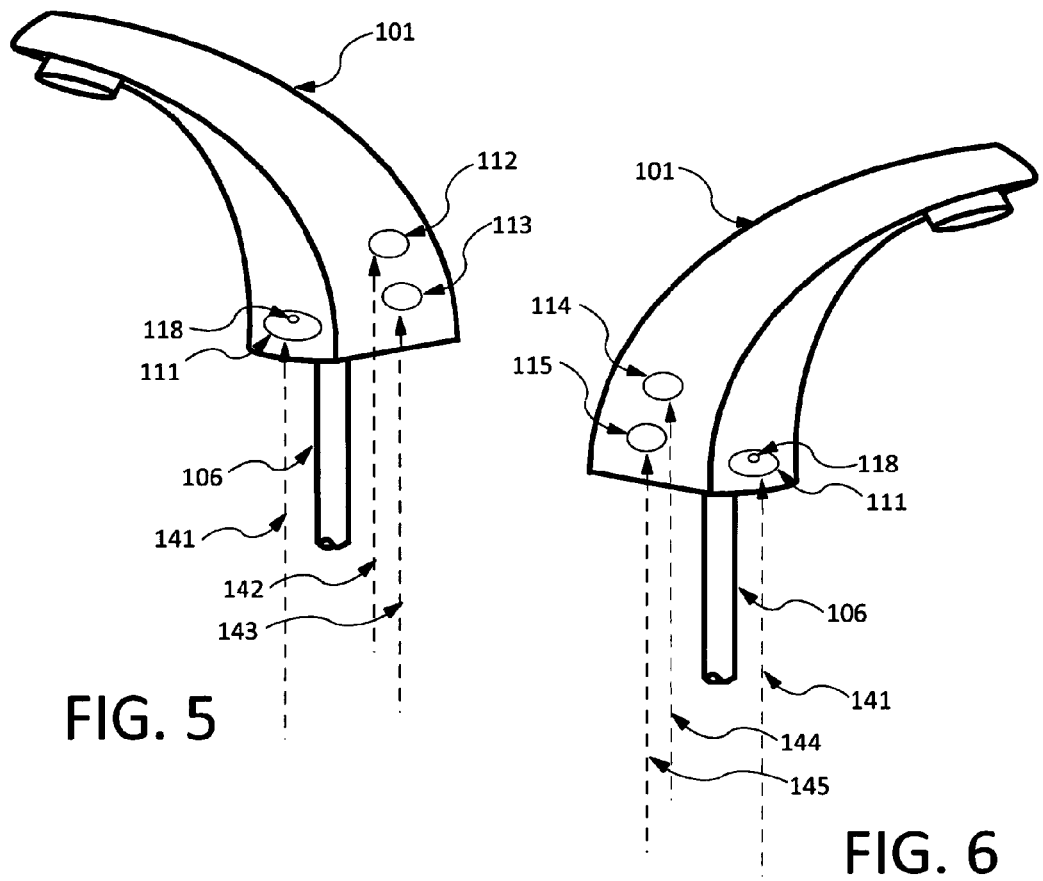

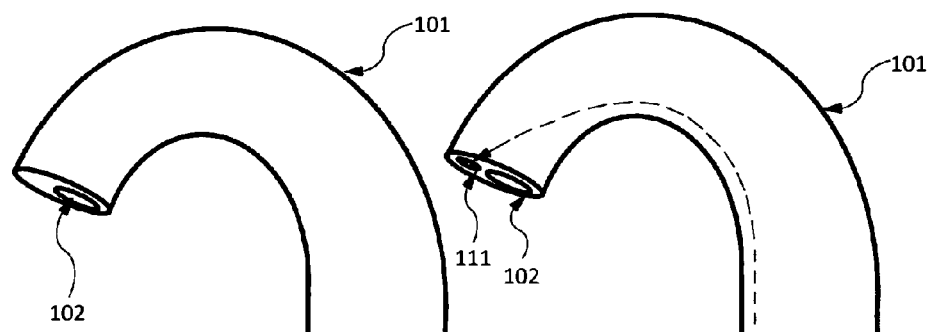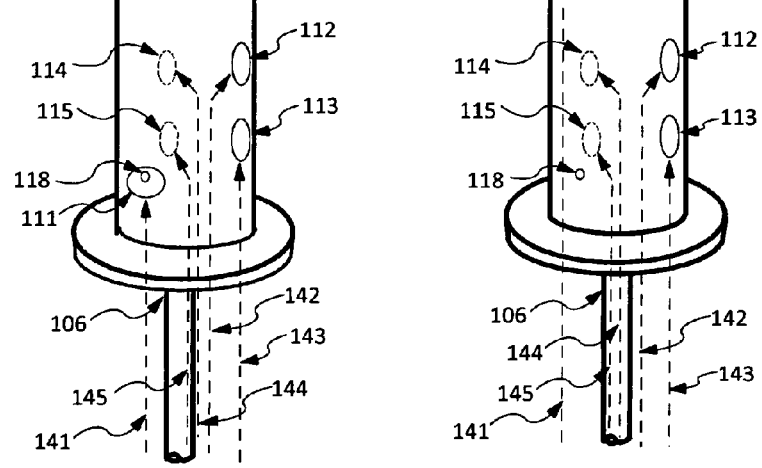

TOUCH-FREE AUTOMATIC FAUCET

CROSS-REFERENCE TO RELATED APPLICATION

This application is a continuation of U.S. application Ser. No. 12/714,443, filed on Feb. 27, 2010, titled System and Method of Touch Free Automatic Faucet, which claims the benefit of the filing date and priority to U.S. Provisional Application No. 61/300,781, filed on Feb. 2, 2010, titled System and Method of Touch Free Automatic Faucet, the entire contents of each are hereby incorporated by reference herein and made part of this specification for all that they disclose.

BACKGROUND

1. Field of the Invention

The present invention generally relates to the field of automatic faucets, more particularly the present invention relates to a touch free automatic faucet that uses infrared sensors in conjunction with logic processor that responds various functions to control water flow and temperature of faucet to provide an easy-convenient operation, water conservation and personal hygiene protection for commercial and residential applications.

2. Description of the Related Art

Automatic faucet has become popular for water saving and green earth. Because of the personal hygiene concern, touch free automatic faucets are ideal for public locations, commercial, residential applications.

The conventional automatic faucet is controlled with single electronic sensor to toggle on-off water flow with preset water temperature; most applications, such as kitchens, lavatories and some commercial, require adjustments on water flow, temperature and continuous water flow services.

From the above mentioned, the followings are the challenges of the touch free automatic faucets:

The first challenge to the use of an automatic faucet is the adjustment of hot-cold water flow ratio for the water temperature. The conventional automatic faucets use a static hot-cold water mixing valve for a preset water temperature; no water temperature adjustment function available for users. But in most applications, water temperature adjustment is needed and necessary, such as kitchens, lavatories and commercial applications. The current improved conventional automatic faucets with a manual hot-cold mixing handle attached on the faucet spout yet require hand-operation to adjust hot-cold water flow ratio, and not a "Touch Free" automatic faucet as claimed. Furthermore, a user can be accidently injured by sudden hot water flow of the previous handle setting.

The second challenge to the use of an automatic faucet for residential is to retain continuous water flow. For example, for the protection against the spread of disease and the water conservation, automatic faucets are installed in public restrooms such as at airports, restaurants or at commercial washstands in medical institutions. Although the advantage of the conventional touch free faucets is simply activated by placing a hand in the vicinity of the faucet spout outlet, the user must keep a hand within the sensor detection zone to keep faucet water flow to filling sink or container.

The third challenge to the use of an automatic faucet is to work in the vicinity around the faucet without triggering the water flow sensor and wasting unnecessary water flow.

The fourth challenge to the use of an automatic faucet is to adjust the water flow of faucet for different applications.

The fifth challenge to the use of an automatic faucet is to reset the water flow rate for water conservation.

The present invention is directed towards meeting these needs, among others.

SUMMARY OF THE INVENTION

The present invention generally relates to automatic sensor-based faucets and methods of operating such faucets.

The touch-free automatic faucet system in this invention comprises a touch free automatic faucet mode; wherein water flow and water temperature are controlled by a flow control valve assembly and a temperature control valve assembly in response to the electronic sensors through a logic processor circuit board. The faucet can be operated either in automatic mode or manual mode to suit all different applications.

The sensing beams of the installed primary electronic sensor (Sensor C), a pair of secondary sensors (Sensor A and Sensor B) and a pair of tertiary sensors (Sensor D and Sensor E) are pointed to different directions, at about 90 degree angle from each other to prevent interference, to control water temperature (Temperature-Control-Mode), continuous water flow (Continue-Water-Flow-Mode), faucet pause (Faucet-Pause-Mode), water flow adjustment (Adjust-Water-Flow-Mode) and default setting (Flow-Temperature-Default-Setting-Mode) for residential and commercial applications for easy-convenient operation, water conservation and personal hygiene protection.

A programmed logic processor with circuit board controls the said sensors, water flow control valve assembly and temperature control valve assembly.

As in a conventional automatic faucet operation, detection of an object in presence within the primary sensor (Sensor C) detection zone (for example, in a sink), the logic processor hence activates the flow control valve assembly (Valve A) for water flow to the faucet spout (activation of Primary-Water-Flow-Mode).

In the activation of Primary-Water-Flow-Mode, water flow control valve assembly (Valve A) is in an activated position for water flow and the primary sensor (Sensor C) senses no object in presence within the detection zone (for example, in a sink), the logic processor hence deactivates the water flow control valve assembly (Valve A) to stop water flow to the faucet spout (deactivation of Primary-Water-Flow-Mode).

At any time, both secondary sensors (Sensor A and Sensor B) sense the presence of an object (for example, a hand) within the detection zone for a time period (Time Continue-flow-on), the logic processor activates the water flow control valve assembly (Valve A) for a continuous water flow (Continue-Water-Flow-Mode) to faucet spout. This Continuous-Water-Flow-Mode operation is convenient for users to filling sink or container without keeping their hands within the detection zone of the primary sensor (Sensor C) for continuous water flow (activation of Continue-Water-Flow-Mode).

Furthermore, in the summary [005] (Primary-Water-Flow-Mode) and summary [007] (Continue-Water-Flow-Mode), wherein said water flow control valve assembly (Valve A) is in activated for water flow to faucet spout. Sensor A of secondary sensors detects the presence of object (for example, a finger) within the detection zone, the logic processor increases the faucet water flow temperature by increasing hot water flow and decreasing cold water flow of the temperature control valve assembly (Valve B) accordingly depending on the sensing time period of sensor (Sensor A); whereas Sensor B of secondary sensors senses the presence of object (for example, a finger) within the detection zone, the logic processor decreases the faucet water flow temperature by decreasing hot water flow and increasing cold water flow of the temperature control valves assembly (Valve B) accordingly depending on the sensing time period of sensor (Sensor B). Faucet water temperature hence is controlled by the function of the pair of secondary sensors (Sensor A and Sensor B) without touching any parts of faucet body (Temperature-Control-Mode).

Furthermore, in the summary [005] (Primary-Water-Flow-Mode) and summary [007] (Continue-Water-Flow-Mode), wherein said water flow control valve assembly (Valve A) is in activated position for water flow, Sensor D of the tertiary sensors senses the presence of object (for example, a finger) within the detection zone, the logic processor increases the water flow to faucet spout by increasing both hot and cold water flow of the water flow control valve assembly (Valve A) accordingly depending on the sensing time period of Sensor D; whereas Sensor E of the tertiary sensors senses the presence of object (for example, a finger) within the detection zone, the logic processor decreases the water flow to faucet spout by decreasing both of hot and cold water flow of the water flow control valves assembly (Valve A) accordingly depending on the sensing time period of Sensor E; faucet water flow hence is adjusted by the function of the pair of tertiary sensors (Sensor D and Sensor E) without touching any parts of faucet (Adjust-Water-Flow-Mode).

Furthermore, in the Continue-Water-Flow-Mode, water flow control valve assembly (Valve A) is activated for water flow. Both of the secondary sensors (Sensor A and Sensor B) sense the presence of object (for example, a hand) within the detection zone for a time period (Time Continue-flow-off), the logic processor deactivates the water flow control valve assembly (Valve B) to stop continuous water flow (Continue-Water-Flow-Mode) to the faucet spout (deactivation of Continue-Water-Flow-Mode).

At the stand-by condition of the faucet, primary sensor (Sensor C) senses no object presence within the detection zone and the flow control valve assembly (Valve A) is in deactivation condition, no water flow from faucet spout; detection of an object (for example, a hand or finger) within the detection zone of Sensor A of the secondary sensors for a time period (Time Sc-pause) triggers the logic processor to pause the function of primary sensor (Sensor C) referred as "Faucet-Pause-Mode". In this Faucet-Pause-Mode, a user can work within the primary sensor detection zone without activating faucet water flow for water conservation (beginning of Faucet-Pause-Mode).

In the Faucet-Pause-Mode, the primary sensor (Sensor C) is paused; Sensor A of the secondary sensors detects an object (for example, a hand or finger) within the detection zone for a time period (Time Sc-reset) triggers the logic processor to reset the function of primary sensor (Sensor C); the faucet system is back to stand-by condition (reset of Faucet-Pause-Mode).

Wherein said primary sensor (Sensor C), the pair of secondary sensors (Sensor A and Sensor B) and the pair of tertiary sensors (Sensor D and Sensor E) are hence functioned to fully control the water flow and water temperature of touch free automatic faucet for commercial and residential applications.

Wherein said water flow control valve assembly and water temperature control valve assembly having two fluid inlet (cold/hot water inlet) and one fluid outlet (mixed cold/hot water flow) conduits, combining with one or more of electric solenoid valves and electric motorized gear valves therefrom to control water flow to the faucet spout.

The default settings of water flow and temperature are programmed in logic processor through the combination function of the paired secondary sensors (Sensor A and Sensor B) and the paired tertiary sensors (Sensor D and Sensor E). The unique Default flow and Temperature Reset function hence prevent a user accidently injured by sudden hot water flow from previous usage and keep faucet water flow at a minimum requirement for water conservation.

A logic processor circuit board comprises a logic processor (Micro Chip) and a circuit board. The logic processor is programmed to function input and output of all the electronic sensors (Sensor A, Sensor B, Sensor C, Sensor D and Sensor E), water flow control valve assembly (Valve A) and water temperature control valve assembly (Valve B).

An electricity power supply package includes a battery pack and an alternating current to direct current transformer to supply direct current to the logic processor circuit board to activate the sensors, flow control valves assembly and motorized temperature control valves assembly.

As mentioned in the summary [005] and [006] (Primary-Water-Flow-Mode), the invented touch free automatic faucet provides the same convenient and water conservation functions as a conventional automatic faucet.

Whereas the summary [008] (Temperature-Control-Mode), the function of the pair of secondary sensors (Sensor A and Sensor B) controls the faucet water temperature with a "touch free" operation; and the Default Temperature Reset function prevents injury by sudden hot water flow.—Solution of Challenge 1.

Whereas the summary [007] and [010] (Continue-Water-Flow-Mode), activation of both secondary sensors (Sensor A and Sensor B) controls a continuous water flow of faucet.—Solution of Challenge 2.

Whereas the summary [011] and [012] (Faucet-Pause-Mode), Sensor A of the secondary sensors pauses the function of primary sensor (Sensor C) and hence stops water flow for user to work within the primary detection zone without activating faucet water flow for water conservation.—Solution of Challenge 3.

Whereas the summary [009] (Adjust-Water-Flow-Mode), the pair of tertiary sensors (Sensor D and Sensor E) adjusts faucet water flow.—Solution of Challenge 4.

Whereas the summary [015] (Flow-Temperature-Default-Setting-Mode), the water flow and temperature hence maintain at the most comfortable temperature and economic flow rate for water conservation.—Solution of Challenge 5.

BRIEF DESCRIPTION OF DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 5 and FIG. 6 illustrating embodiments of the electronic sensors on both sides of embodiment of this invention;

FIG. 7, FIG. 8 and FIG. 9 illustrating embodiments of different arrangements of electronic sensors of this invention;

DETAILED DESCRIPTION

For the purposes of promoting an understanding of the principles of the invention, reference will now be made to the preferred embodiment and specific language will be used to describe the same. The drawings depict illustrative embodiments that are not intended to limit or restrict the scope of the invention.

An illustrative embodiment of the present invention provides a lavatory-kitchen-type faucet that can be fully functioned for all operational needs. In order to provide water-efficient operation that is easy and convenient to use, the water is activated and deactivated in response to a primary electronic sensor that detects an object presence under the spout, so as to provide the most water-efficient operation in Primary-Water-Flow-Mode. For other applications, such as filling the sink, container or washing dishes, food etc. continuous water flow is needed. The invented faucet can be switched in/out a Continue-Water-Flow-Mode without touching any parts of faucet body. Hence the personal hygiene is protected. In addition, in the uniquely designed Faucet-Pause-Mode the user can work in the vicinity of the faucet without water running. Furthermore, the two pairs of sensors are functioned in Adjust-Water-Flow-Mode and Temperature-Control-Mode to adjust water flow and temperature. Another unique Flow-Temperature-Default-Setting-Mode function provides a default water flow setting and a default water temperature setting to prevent users accidently injured by sudden hot water flow from previous usage and also to keep faucet water flow at a minimum requirement for water conservation.

The following figures and drawings description of embodiments of the invention illustrating the above mentioned functions of this invention.

Figure 1:
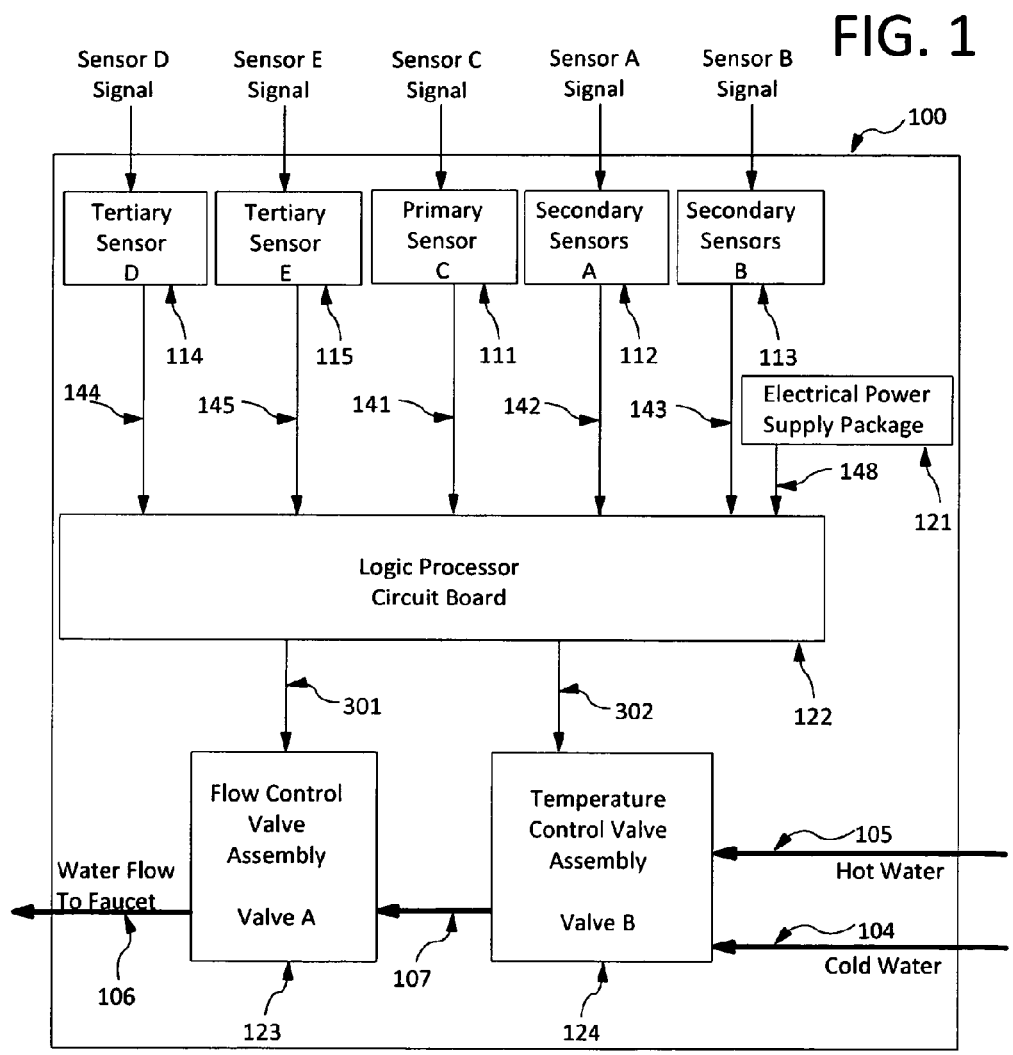
FIG. 1 is a block diagram illustrating embodiments of the touch-free automatic faucet system in this invention.

FIG. 1 is a block diagram of an illustrative touch free automatic faucet according to the present invention. The illustrative touch-free automatic faucet system (100) is shown coupled to a cold water source (104), a hot water source (105) and an outlet mixed water flow to faucet (106). The system (100) includes one primary electronic sensor (111), a pair of secondary electronic sensor assembly (112 and 113), a pair of tertiary electronic sensor assembly (114 and 115), an electrical power supply package (121), a logic processor circuit board (122), a water flow control assembly (123) and temperature control system assembly (124). The sensing signals (141, 142, 143, 144 and 145) from primary electronic sensor C (111), the pair of secondary electronic sensors A & B (112, 113) and the pair of tertiary electronic sensors D & E (114, 115) input to logic processor circuit board (122). The outputs of logic processor (301 and 302) control the water flow control assembly (123) and temperature control system assembly (124). The electricity power supply package (121) supplies electrical power (148) to logic process circuit board (122) and hence the whole system.

Figure 2:
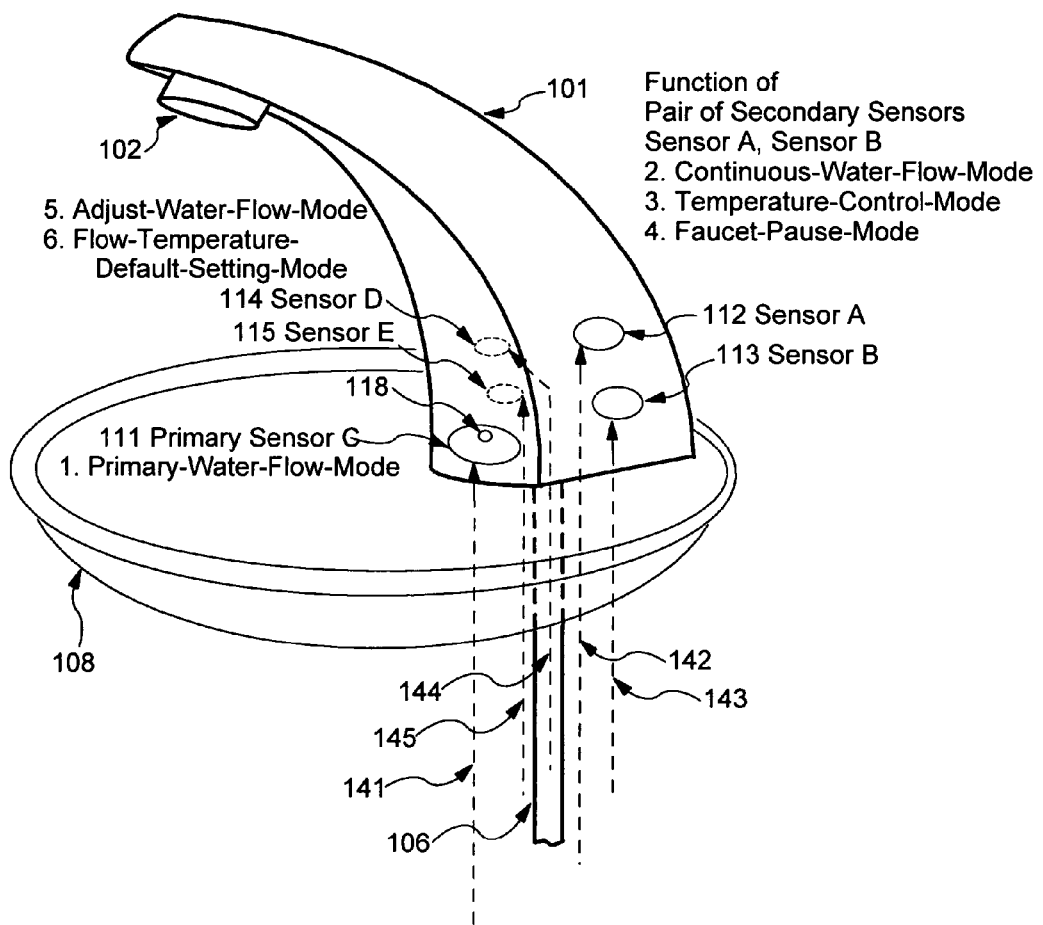
FIG. 2 is a diagram illustrating embodiments of the function of touch-free automatic faucet system in this invention.

FIG. 2 is a diagram illustrating embodiments of the functions of touch-free automatic faucet system in this invention.

The function of primary sensor C (111) is to activate Primary-Water-Flow-Mode when water needed in the sink area (108) for washing hands or foods, and etc.

The pair of secondary sensors (Sensor A) (112) and (Sensor B) (113) serves for three functions:

1. The combination functions of secondary sensors (Sensor A and Sensor B) (112 and 113) activate/deactivate a Continue-Water-Flow-Mode to filling sink, container or to wash dishes, food, and etc.

2. In the Primary-Water-Flow-Mode or Continue-Water-Flow-Mode, water flowing from the faucet; the pair of secondary sensors (Sensor A and Sensor B) (112 and 113) are functioned to adjust water temperature (Temperature-Control-Mode).

3. The primary sensor (Sensor C) (111) is in deactivation condition, activation of Sensor A (112) triggers a "Faucet-Pause-Mode" to pause function of Sensor C (111) for the user to work in the vicinity of faucet without water flowing.

The pair of tertiary sensors (Sensor D, Sensor E) (114) (115) control the water flow of faucet (Adjust-Water-Flow-Mode).

The pair of secondary sensors (Sensor A, Sensor B) (112) (113) and The pair of tertiary sensors (Sensor D, Sensor E) (114) (115) control the default setting of water flow and temperature of faucet (Flow-Temperature-Default-Setting-Mode).

Figure 3:
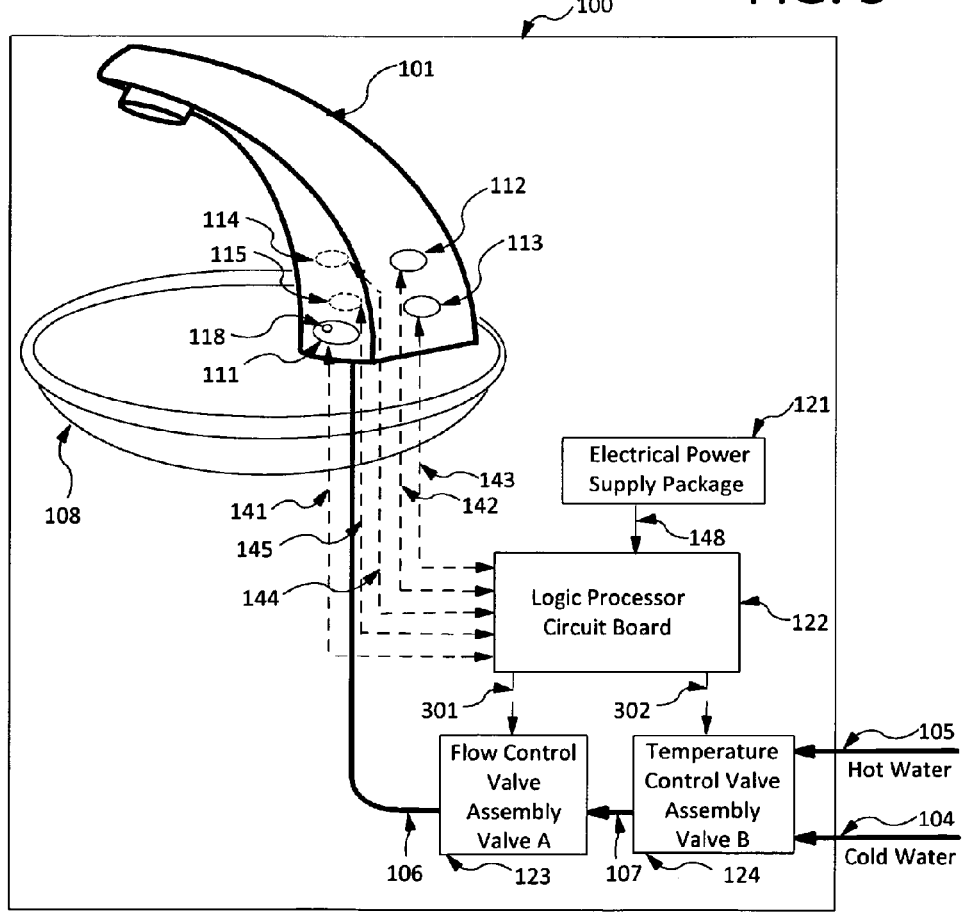
FIG. 3 is a flow diagram illustrating embodiments of the control logic of the system and method of this invention.

FIG. 3 is an illustrative embodiment lavatory-kitchen-type faucet according to the present invention. The illustrative touch-free automatic faucet system (100) is shown with a mixed water flow (106) to the faucet spout (101). Faucet spout (101) comprises one primary electronic sensor (111), a LED indicator (118), a pair of secondary electronic sensors (112 and 113) and a pair of tertiary electronic sensors (114 and 115) which are mounted on the faucet body (101). Each of these electronic sensors (111, 112, 113, 114 and 115) includes a set of infrared transmitter and receiver to detect the presence of object and a LED indicator (118) for system information indication. The primary sensor C (111) senses the sink area (108) for Primary-Water-Flow-Mode operation. The pair of secondary sensors A & B (112 and 113) and the pair of tertiary electronic sensors (114 and 115) are functioned to control Continue-Water-Flow-Mode, Temperature-Control-Mode, Faucet-Pause-Mod and Adjust-Water-Flow-Mode of the faucet (101). The faucet system (100) also includes an electricity power supply package (121) to supply the needed electrical power (148) to the control system, a logic processor circuit board (122) with preload logic program to control the faucet system (100), a water flow control valve assembly (123) and a temperature control valve assembly (124) to control water flow (301) and temperature (302).

Figure 4:
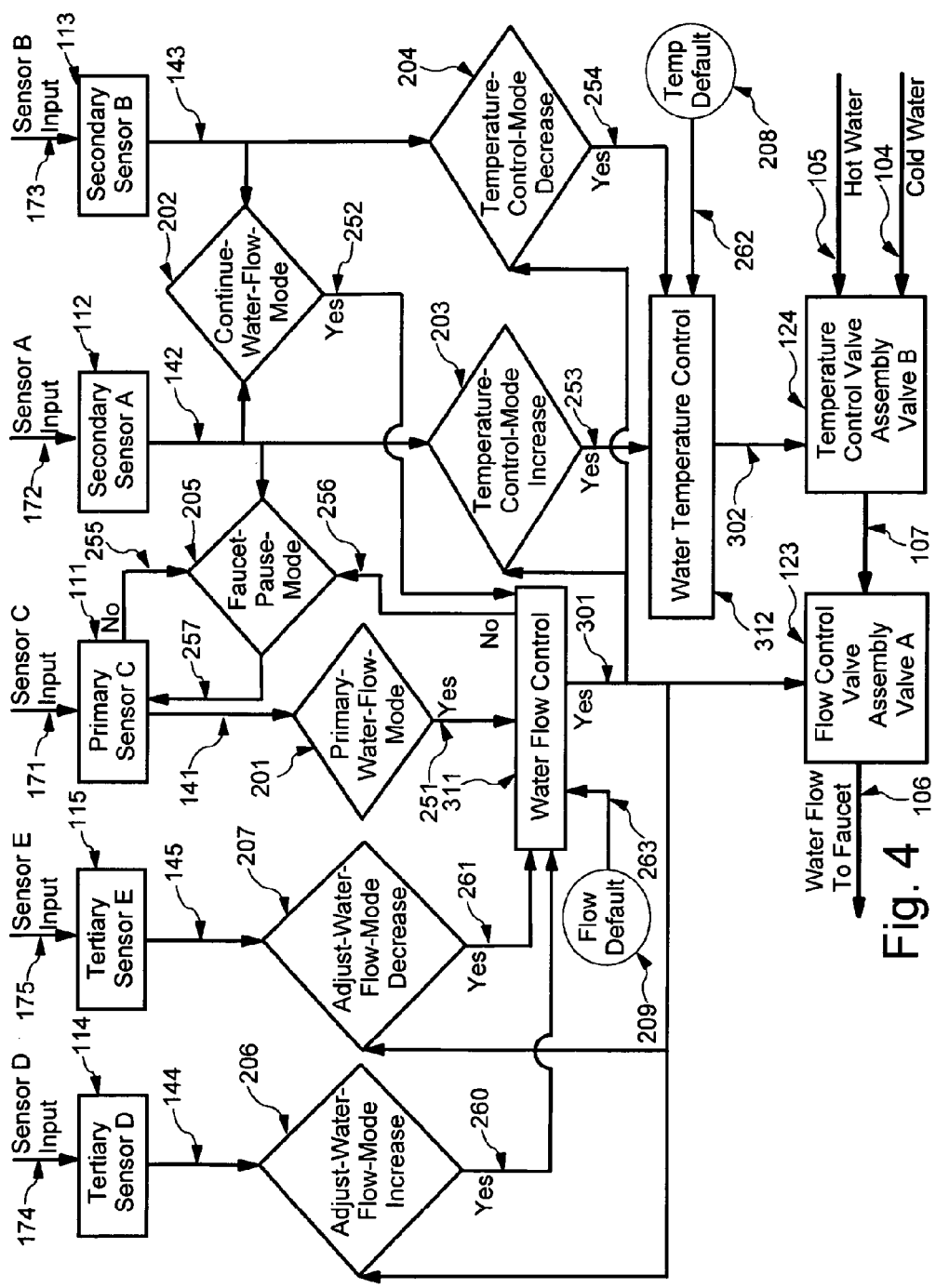
FIG. 4 is a logic flow diagram illustrating embodiments of the control logic of the system and method of this invention.

FIG. 4 is a logic diagram shows the logic procedures and method of the system using electronic sensor (infrared sensor) detecting devices, logic processor, water flow control valves for water flow and temperature control to enable "touch free" and "automatic" of faucet in the present invention.

An object in presence within the primary sensor (Sensor C) (111) detection zone (171) (for example, in a sink) activates (141) primary sensor (Sensor C) (111) and hence the logic processor (122) activates (301) the flow control valve assembly (Valve A) (123) for water flow to the faucet spout (101) (activation of Primary-Water-Flow-Mode) (201).

In the activation of Primary-Water-Flow-Mode (201) operation, water flow control valve assembly (Valve A) (123) is in activated position for water flow, whereas the primary sensor (Sensor C) (111) detects (141) no object in presence within the detection zone (171) (for example, in a sink), the logic processor (122) deactivates (301) the water flow control valve assembly (Valve A) (123) to stop water flow to the faucet spout (101) (deactivation of Primary-Water-Flow-Mode) (201).

At any time, both of the secondary sensors (Sensor A and Sensor B) (112 and 113) sense the presence of an object (for example, a hand) within the detection zone for a time period (Time Continue-flow-on) (142 and 143), the logic processor (122) activates (301) the water flow control valve assembly (Valve A) (123) for a continuous water flow (252) (Continue-Water-Flow-Mode) (202) to faucet spout (101). This Continuous-Water-Flow-Mode (202) operation is convenient for users to filling sink or container without keeping their hands within the detection zone (108) of the primary sensor (Sensor C) (111) (activation of Continue-Water-Flow-Mode) (202).

Furthermore, in FIG. 4 detail [109] (Primary-Water-Flow-Mode) (201), FIG. 4 detail [111] (Continue-Water-Flow-Mode) (202), wherein said water flow control valve assembly (Valve A) (123) is in activated position for water flow (301) to faucet spout (101). Sensor A (112) of the secondary sensors detects (142) the presence of object (for example, a finger) within the detection zone (172), the logic processor (122) increases the faucet water flow temperature by increasing hot water flow (105) and decreasing cold water flow (104) of the temperature control valve assembly (Valve B) (124) accordingly depending on the sensing time period of sensor (Sensor A) (112); whereas, Sensor B (113) of the pair of secondary sensors detects (173) the presence of object (for example, a finger) within the detection zone (143), the logic processor (122) decreases the faucet water flow temperature by decreasing hot water flow (105) and increasing cold water flow (104) of the temperature control valves assembly (Valve B) (124) accordingly depending on the sensing time period of sensor (Sensor B) (113). Faucet water flow temperature hence is controlled by the function of the pair of secondary sensors (Sensor A and Sensor B) (112 and 113) without touching any parts of faucet body (101) (Temperature-Control-Mode) (203 and 204).

Furthermore, in FIG. 4 detail [109] (Primary-Water-Flow-Mode) (201), FIG. 4 detail [111] (Continue-Water-Flow-Mode) (202), the water flow control valve assembly (Valve A) (123) is in activated position for water flow (301) to faucet spout (106). Sensor D (114) of the tertiary sensors senses (144) the presence of object (for example, a finger) within the detection zone (174), the logic processor (122) increases the water flow (260) to faucet spout (101) by increasing both hot and cold water flow of the water flow control valve assembly (Valve A) (123) accordingly depending on the sensing time period of Sensor D (144); whereas Sensor E (145) of the tertiary sensors senses (145) the presence of object (for example, a finger) within the detection zone (175), the logic processor (122) decreases the water flow (261) to faucet spout (101) by decreasing both of hot and cold water flow of the water flow control valves assembly (Valve A) (123) accordingly depending on the sensing time period of Sensor E (145); faucet water flow hence is adjusted by the function of the pair of tertiary sensors (Sensor D and Sensor E) (114 and 115) without touching any parts of faucet (101) (Adjust-Water-Flow-Mode) (206 and 207).

Furthermore, the faucet is in Continue-Water-Flow-Mode (202), water flow control valve assembly (Valve A) (123) is activated for water flow (301) to faucet spout (106). Both of the secondary sensors (Sensor A and Sensor B) (112 and 113) sense the presence of object (for example, a hand) within the detection zone (142 and 143) for a time period (Time Continue-flow-off), the logic processor (122) deactivates (301) the water flow control valve assembly (Valve B) (123) to stop continuous water flow (252) (Continue-Water-Flow-Mode) (202) (deactivation of Continue-Water-Flow-Mode) (202).

Wherein the faucet (100) is in stand-by condition, said primary sensor (Sensor C) (111) senses no object presence within the detection zone (255) and the flow control valve assembly (Valve A) (123) is in deactivation condition (301), no water flow from faucet spout (256); detection (142) of an object (for example, a hand or finger) within the detection zone of Sensor A (112) of the secondary sensors for a time period (Time Sc-pause) triggers the logic processor (122) to pause (257) the function of primary sensor (Sensor C) (111) referred as "Faucet-Pause-Mode" (205); at Faucet-Pause-Mode, a user can work within the primary sensor detection zone without activating faucet water flow for water conservation (beginning of Faucet-Pause-Mode).

In the Faucet-Pause-Mode (205), wherein said primary sensor (Sensor C) (111) is paused (257); Sensor A (112) of the secondary sensors detects (142) an object (for example, a hand or finger) within the detection zone for a time period (Time Sc-reset) triggers the logic processor to reset (257) the function of primary sensor (Sensor C) (111); the faucet system (100) is back to stand-by condition (reset of Faucet-Pause-Mode) (205).

The default settings of water flow (209) and temperature (208) are programmed in logic processor (122) through the combination function of the paired secondary sensors (Sensor A, 112 and Sensor B, 113) and the paired tertiary sensors (Sensor D, 114 and Sensor E, 115). The unique Default flow (263) and Temperature (262) Reset function hence prevent a user accidently injured by sudden hot water flow from previous usage and keep faucet water flow at a minimum requirement for water conservation.

Wherein said water flow control valve assembly (123) and water temperature control valve assembly (124) having a cold fluid inlet (104), a hot fluid inlet (105) and one fluid outlet (106) conduits, combining with one or more of electric solenoid valves and electric motorized gear valves therefrom to control water flow (106) to the faucet spout.

Wherein said primary sensor (Sensor C) (111), the pair of secondary sensors (Sensor A and Sensor B) (112, 113) and the pair of tertiary sensors (Sensor D and Sensor E) (114, 115) are hence functioned to fully control the water flow (301) and water temperature (302) of touch free automatic faucet for commercial and residential applications.

FIG. 5 and FIG. 6 illustrating embodiments of faucet, the sensing beam of the primary sensor C (111) directed to the front side of the faucet (101), the pair of secondary sensors (112 and 113) and the pair of tertiary sensors (114 and 115) are mounted on different sides of faucet body at about 90 degree angle from the primary sensor (Sensor C) (111) to prevent interference.

FIG. 7 and FIG. 8 illustrating embodiments of different arrangements of electronic sensors in this invention; The primary sensor (Sensor C) (111) can be installed on the outlet of faucet spout (101) for better detection.

Figure 9:
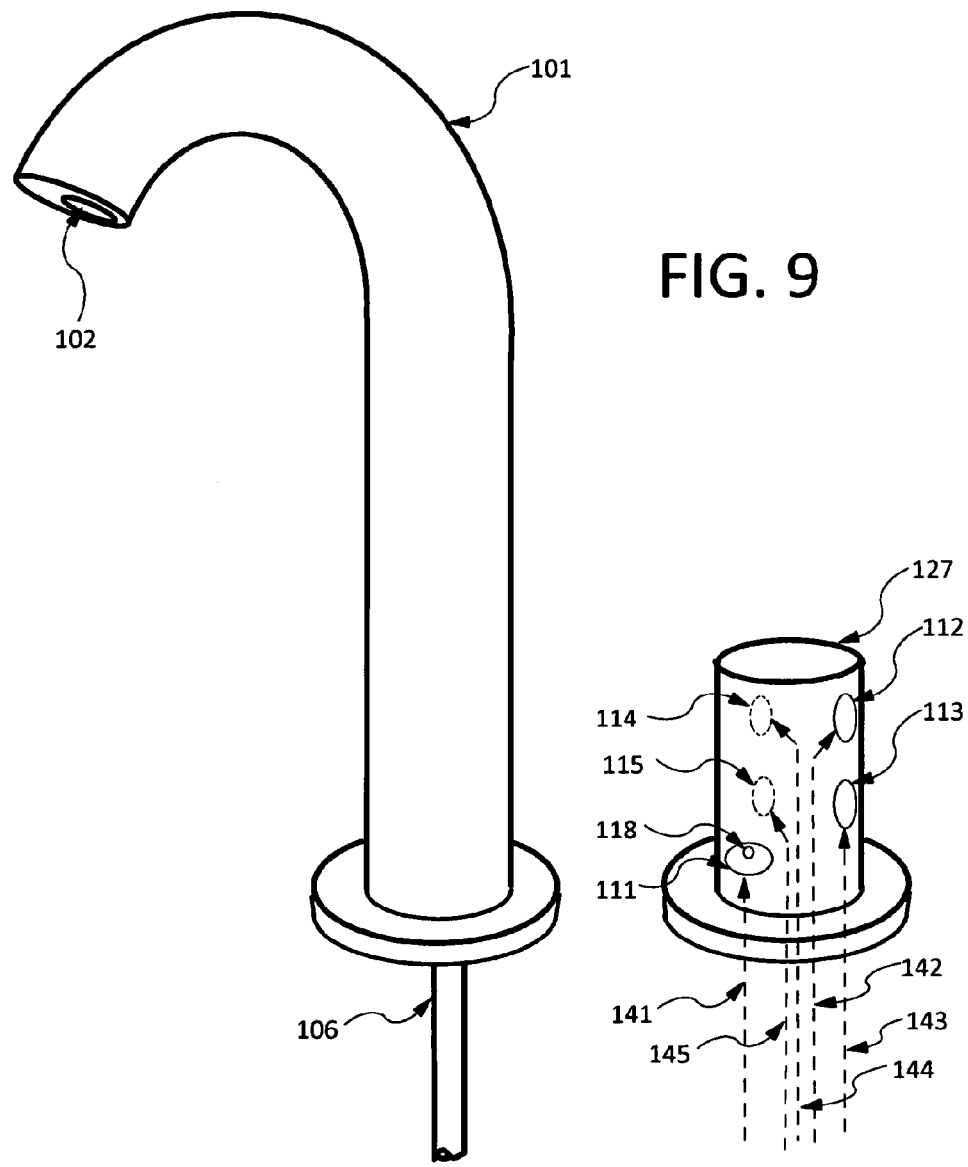

FIG. 9 illustrating embodiments of different arrangements of electronic sensors of this invention; the separate faucet sensor compartment (127) design feature provides easy-access of kitchen-lavatory applications, especially for children, handicapped and elder users etc.

Figure 10:
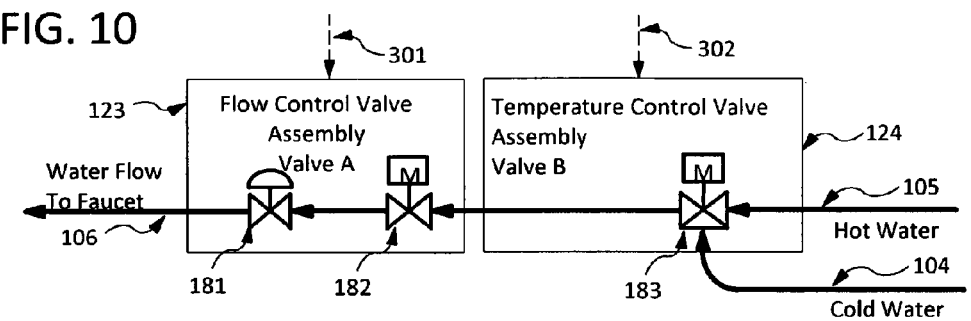
FIG. 10, FIG. 11 and FIG. 12 illustrating embodiments of different arrangements of water flow control valve assembly and temperature control valve assembly of this invention.

FIG. 10 illustrating embodiments of water flow control valve assembly (123) and temperature control valve assembly (124) in this invention. The flow control valve assembly (123) comprises a solenoid valve (181) and a motorized gear valve (182). The solenoid valve (181) receives signal (301) from logic processor to toggle on/off the valve (181) to start/stop water flow (106) to faucet spout (101). The motorized gear valve (182) adjusts the water flow (106) according to the signal input (301). The temperature control valve assembly (124) comprises a three-way motorized gear valve (183) to adjust cold/hot water flow ratio from cold water inlet (104)

and hot water inlet (105) according to the input signal (302) from the output of logic processor (122).

Figure 11:
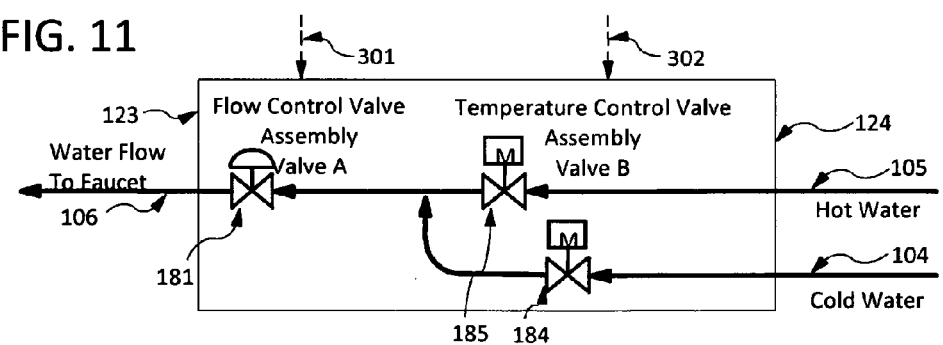

FIG. 11 illustrating another embodiments of water flow control valve assembly (123) and temperature control valve assembly (124) in this invention. The flow/temperature control valve assembly (123 and 124) comprises a solenoid valve (181) and two motorized gear valves (184 and 185). The solenoid valve (181) receives signal (301) from logic processor to toggle on/off the valve (181) to start/stop water flow to faucet spout. The water flow/temperature control valve assembly (123 and 124) comprises two two-way motorized gear valves (184 and 185) to adjust cold/hot water flow ratio from cold water inlet (104) and hot water inlet (105) according to the input signal (301 and 302) from the output of logic processor (122).

Figure 12:
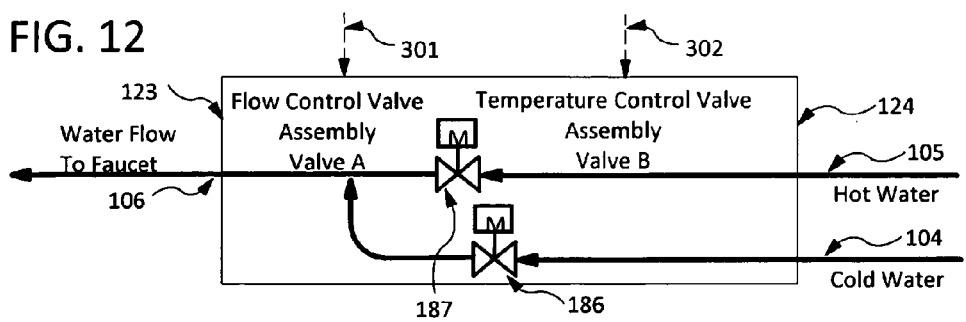

FIG. 12 illustrating another embodiments of water flow control valve assembly (123) and temperature control valve assembly (124) in this invention. The flow/temperature control valve assembly (123 and 124) comprises two two-way motorized gear valves (186 and 187) to toggle on/off and to adjust cold/hot water flow ratio from cold water inlet (104) and hot water inlet (105) according to the input signal (301 and 302) from the output of logic processor (122).

Industrial Applicability

The invention provides a touch-free automatic faucet with three or more sensors to control water flow and temperature for commercial and residential applications for easy-convenient operation, water conservation and personal hygiene protection.

1. A system and method of touch free automatic faucet comprising: a primary sensor (in this case, Infrared sensor, Sensor C), a pair of secondary sensors (in this case, Infrared sensors, Sensor A and Sensor B), a pair of tertiary sensors (in this case, Infrared sensors, Sensor D and Sensor E), an electricity power supply package, a logical processor (in this case, Micro Chip) circuit board, a logic program loaded in the processor, a water flow control valve assembly, a temperature control valve assembly, at least one faucet body housing and at least one inlet fluid line.

2. The touch free automatic faucet of claim 1, wherein the primary sensor (Sensor C), the pair of secondary sensors (Sensor A and Sensor B), a pair of tertiary sensors (Sensor D and Sensor E), each sensor includes a set of transmitter and receiver mounted on the faucet body or the faucet assembly therein detecting the presence of objects near the automatic faucet.

3. The touch free automatic faucet of claim 1, wherein said function of water flow and temperature control of faucet by primary electronic sensor (Sensor C), the pair of secondary electronic sensors (Sensor A and Sensor B) and the pair of tertiary electronic sensors (Sensor D and Sensor E) provide a convenient, efficient and easy-operational mode whereas additional electronic sensors may be added to perform the same function also included in this claim.

4. The touch free automatic faucet of claim 1, wherein said water flow control valve assembly having inlet and outlet conduits extending therefrom; said water flow control valve assembly having one or more solenoid activated valve with solenoid actuator or motorized gear driven valves to control water flow to faucet.

5. The touch free automatic faucet of claim 1, wherein said temperature control valve assembly having one or more of motorized gear driven valves; wherein said temperature control valve assembly having two fluid inlet and one fluid outlet conduits extending therefrom to control water flow temperature to the faucet.

6. The touch free automatic faucet of claim 1, wherein said primary sensor (Sensor C) senses the presence of an object within the detection zone, the logic processor responds output signal to activate the water flow control valve assembly (Valve A) to start water flow to faucet (activation of Primary-Water-Flow-Mode) at preset temperature (Temp Default).

7. The touch free automatic faucet of claim 1, wherein said faucet is in Primary-Water-Flow-Mode, water flow control valve assembly (Valve A) is in activated position, primary sensor (Sensor C) senses no object presented within the detection zone, the logic processor responds output signal to deactivate the water flow control valve (Valve A) to stop water flow to the faucet spout (deactivation of Primary-Water-Flow-Mode) and to reset the temperature control valves back to default temperature setting (Temp Default).

8. The touch free automatic faucet of claim 1, wherein both secondary sensors (Sensor A and Sensor B) sense the presence of an object (for example, a hand) for a time period (Time Continue-on), the signals from both sensors thus trigger the logic processor to respond an output signal to activate the water flow control valve assembly (Valve A) to begin a continuous water flow (activation of Continue-Water-Flow-Mode) to faucet spout at default temperature (Temp Default).

9. The touch free automatic faucet of claim 6 (Primary-Water-Flow-Mode) or claim 8 (Continue-Water-Flow-Mode), wherein said water flow control valve assembly (Valve A) is in activated position whereas water flows to faucet spout, said Sensor A of the secondary sensors senses the presence of object (for example, a finger) within the detection zone, the logic processor increases the faucet water flow temperature by increasing hot water flow and decreasing cold water flow of the temperature control valve assembly (Valve B) accordingly depending on the sensing time period of Sensor A; whereas Sensor B of the secondary sensors senses the presence of object (for example, a finger) within the detection zone, the logic processor decreases the faucet water flow temperature by decreasing hot water flow and increasing cold water flow of the temperature control valves assembly (Valve B) accordingly depending on the sensing time period of Sensor B; faucet water flow temperature hence is controlled by the function of the pair of secondary sensors (Sensor A and Sensor B) without touching any parts of faucet (Temperature-Control-Mode).

10. The touch free automatic faucet of claim 6 (Primary-Water-Flow-Mode) and claim 8 (Continue-Water-Flow-Mode), wherein said water flow control valve assembly (Valve A) is in activated position for water flow, said Sensor D of the tertiary sensors senses the presence of object (for example, a finger) within the detection zone, the logic processor increases the water flow to faucet spout by increasing both hot and cold water flow of the water flow control valve assembly (Valve A) accordingly depending on the sensing time period of Sensor D; whereas Sensor E of the tertiary sensors senses the presence of object (for example, a finger) within the detection zone, the logic processor decreases the water flow to faucet spout by decreasing both of hot and cold water flow of the water flow control valves assembly (Valve A) accordingly depending on the sensing time period of Sensor E; faucet water flow hence is adjusted by the function of the pair of tertiary sensors (Sensor D and Sensor E) without touching any parts of faucet (Adjust-Water-Flow-Mode).

11. The touch free automatic faucet of claim 1 and claim 8 (Continue-Water-Flow-Mode), wherein said water flow control valve assembly (Valve A) is in activated position whereas faucet water flows continuously (activation of Continue-Water-Flow-Mode), said both of the corresponding secondary sensors (Sensor A and Sensor B) sense the presence of object (for example, a hand or a finger) within the detection zone for a time period (Time Continue-off), the logic processor responds output signal to deactivate the flow control valve assembly (Valve A) to stop water flow to the faucet spout; this claim includes a continuous water flow controlling function (deactivation of Continue-Water-Flow-Mode) by two combination of sensors (in this case, Sensor A and Sensor B of the secondary sensors) herein.

12. A logic function (in this case, activation or deactivation of Continue-Water-Flow-Mode) is triggered by a combination of function of two sensors (in this case, Sensor A and Sensor B of the secondary sensors) is claimed.

13. The touch free automatic faucet of claim 1, wherein the faucet is in stand-by condition, said primary sensor (Sensor C) senses no object presence within the detection zone and the flow control valve assembly (Valve A) is in deactivation condition, no water flow from faucet spout; detection of an object (for example, a hand or finger) within the detection zone of Sensor A of the secondary sensors for a time period (Time Sc-pause) triggers the logic processor to pause the function of primary sensor (Sensor C) referred as "Faucet-Pause-Mode"; at Faucet-Pause-Mode, a user can work within the primary sensor detection zone without activating faucet water flow for water conservation (beginning of Faucet-Pause-Mode).

14. The touch free automatic faucet of claim 1 and claim 13 (Faucet-Pause-Mode), wherein said primary sensor (Sensor C) is paused; Sensor A of the secondary sensors detects an object (for example, a hand or finger) within the detection zone for a time period (Time Sc-reset) triggers the logic processor to reset the function of primary sensor (Sensor C); the faucet system is back to stand-by condition (reset of Faucet-Pause-Mode).

15. The touch free automatic faucet of claim 13 (beginning of Faucet-Pause-Mode) and claim 14 (reset of Faucet-Pause-Mode), wherein a sensor (in this case, to pause and to reset of primary Sensor C) is controlled by another sensor (in this case, Sensor A of the secondary sensors) is claimed.

16. The touch free automatic faucet of claim 8 (activation of Continue-Water-Flow-Mode) and claim 11 (deactivation of Continue-Water-Flow-Mode); claim 9 (Temperature-Control-Mode); claim 13 (beginning of Faucet-Pause-Mode) and claim 14 (reset of Faucet-Pause-Mode); wherein said the function of controlling a continuous water flow (Continue-Water-Flow-Mode), water temperature (Temperature-Control-Mode), and function of pause-reset sensor (Faucet-Pause-Mode) by a pair of electronic sensors (In this case, Sensor A and Sensor B of the secondary sensors) thus claimed in this invention.

17. The default settings of water flow and temperature are programmed in logic processor through the combination function of the paired secondary sensors (Sensor A and Sensor B) and the paired tertiary sensors (Sensor D and Sensor E) (Flow-Temperature-Default-Setting-Mode).

18. The touch free automatic faucet of claim 1, wherein said logic processor circuit board comprises a logic processor (Micro Chip), a reset switch and a circuit board; the logic processor is programmed to function all the inputs and outputs of the five electronic sensors (Sensor A, Sensor B, Sensor C, Sensor D and Sensor E), the water flow control valve assembly (Valve A) and the temperature control valves assembly (Valve B); and a reset switch to reset the system to stand-by condition.

19. The touch free automatic faucet of claim 1, wherein said an electricity power supply package includes a battery pack and an alternating current to direct current transformer to supply direct current to the logic processor circuit board and the whole system operation.

What is claimed is:

1. A faucet apparatus for providing touch-free control of water flow, the faucet apparatus comprising:
    a spout configured to direct water flow into a sink;
    a logic processor;
    a first sensor zone comprising a first sensor, said first sensor zone facing the area in which the spout is configured to direct water to flow, such that the first sensor is configured to detect an object in the first sensor zone and respond to the detection by providing input to the logic processor;
    a second sensor zone comprising a second sensor, such that the second sensor is configured to detect an object in the second sensor zone and respond to the detection by providing input to the logic processor;
    a third sensor zone comprising a third sensor, such that the third sensor is configured to detect an object in the third sensor zone and respond to the detection by providing input to the logic processor;
    a fourth sensor zone comprising one or more sensors configured to detect an object in the fourth sensor zone and respond to the detection by providing input to the logic processor;
    a first control valve comprising a water mixing assembly, said first control valve configured to receive hot water from a hot water input, to receive cold water from a cold water input, to output mixed water through a mixed water output, to receive a temperature control signal from the logic processor, and to mechanically respond to the temperature control signal by mechanically adapting the water mixing assembly in order to adjust the temperature of the mixed water that is output through the mixed water output such that the temperature is determined by the temperature control signal; and
    a second control valve comprising a water flow control assembly, said second control valve configured to receive mixed water at a first flow rate from a mixed water input, to output mixed water at a second flow rate through a controlled water output, to receive a flow control signal from the logic processor, and to mechanically respond to the flow control signal by mechanically adapting the water flow control assembly in order to adjust the flow of the mixed water from the first flow rate to the second flow rate such that the second flow rate is controlled by the water flow control signal;
    wherein the logic processor is programmed to:
        determine whether an electronic representation of a paused state is in either a paused-mode or a non-paused-mode;
        receive input from the first sensor indicating the presence of an object within the first sensor zone and, in response thereto, cause the spout to direct water flow while the input from the first sensor indicates that an object is present in the first sensor zone, if it is determined that the electronic representation of the paused state is in the non-paused mode;
        cause the spout to stop directing water flow when the input from the first sensor indicates that no object is present within the first sensor zone;
        receive input from the second sensor indicating the presence of an object within the second sensor zone and, in response thereto, transmit the temperature control signal to the first control valve;
        receive input from the third sensor indicating the presence of an object within the third sensor zone and, in response thereto, transmit the water flow control signal to the second control valve; and receive input from said one or more sensors comprising said fourth sensor zone indicating the presence of an object within the fourth sensor zone and, in response thereto, change the electronic representation of the paused state to the paused-mode.

2. The faucet apparatus of claim 1, wherein said fourth sensor zone comprises said second sensor zone, said second sensor, said third sensor zone, and said third sensor, and wherein said logic processor is further programmed to receive input from said second sensor and said third sensor indicating the presence of an object within the fourth sensor zone and, in response thereto, change the electronic representation of the paused state to the paused-mode.

3. The faucet apparatus of claim 1, wherein the logic processor is further programmed to:
   receive input from said one or more sensors comprising said fourth sensor zone indicating the presence of an object within the fourth sensor zone and, in response thereto, change the electronic representation of the paused state to the paused-mode if the paused state is presently in the non-paused mode; and
   receive input from said one or more sensors comprising said fourth sensor zone indicating the presence of an object within the fourth sensor zone and, in response thereto, change the electronic representation of the paused state to the non-paused-mode if the paused state is presently in the paused mode.

4. The faucet apparatus of claim 1, further comprising an electrical power supply package comprising a battery and an alternating current-to-direct current transformer, wherein the electrical power supply package is electronically coupled to the logic processor and supplies direct current to the logic processor.

5. The faucet apparatus of claim 1, wherein the water flow control assembly comprises a solenoid valve and a motorized gear valve, wherein the solenoid valve is configured to toggle the valve on and off in order to start and stop water flow to the spout, and the motorized gear valve is configured to adjust the flow of the mixed water to the spout.

6. The faucet apparatus of claim 1, wherein the temperature flow control assembly comprises a motorized gear valve.

7. The faucet apparatus of claim 1, further comprising a separate compartment physically distinct from the spout, wherein the second sensor and third sensor are both embedded within the separate compartment.

8. The faucet apparatus of claim 1, wherein the spout comprises a planar spout face with a water outlet, and wherein the first sensor is embedded within the planar spout face.

9. The faucet apparatus of claim 1, wherein the spout comprises a spout shaft that channels the mixed water output by the second control valve, and wherein the first sensor is embedded within the base of the spout shaft.

10. The faucet apparatus of claim 9, wherein the spout shaft is substantially cylindrical.

11. A method for providing touch-free control of water flow from a faucet, the method apparatus comprising:
   receiving, at a digital processor, an input from a first sensor indicating the presence of an object in an area in which a spout is configured to direct water flow;
   causing, in response to receiving the input from the first sensor, the spout to direct water flow while the input from the first sensor indicates that an object is present in the area in which the spout is configured to direct water, if an electronic representation of a paused state for a faucet's water flow is in a non-paused mode,
   receiving, at a digital processor, an input from a second sensor indicating the presence of an object in front of the second sensor;
   causing, in response to receiving the input from the second sensor, a first control valve to mechanically adapt a water mixing assembly, wherein the first control valve receives hot water into the water mixing assembly from a hot water input, receives cold water into the water mixing assembly from a cold water input, and mechanically adapts the water mixing assembly thereby adjusting the ratio of hot water and cold water that is received into the water mixing assembly, and wherein the first control valve outputs mixed water such that the temperature of the output water is determined by the input from the second sensor;
   receiving, at a digital processor, an input from a third sensor indicating the presence of an object in front of the third sensor;
   causing, in response to receiving the input from the third sensor, a second control valve to mechanically adapt a water flow rate, wherein the second control valve receives mixed water from a water input, mechanically adapts the flow rate of the mixed water through the second control, and outputs the resulting flow-controlled water, such that the flow rate of the flow-controlled water is determined by the input from the third sensor;
   receiving, at a digital processor, a fourth input indicating the presence of an object in front of one or more sensors; and
   causing, in response to receiving the fourth input, the electronic representation of the paused state for the faucet's water flow to toggle between a paused mode and a non-paused mode.

12. The method of claim 11, wherein receiving the fourth input comprises receiving an input from the first sensor and receiving an input from the second sensor substantially simultaneously.

13. The method of claim 11, wherein receiving the fourth input comprises receiving an input from a fourth sensor.

14. The method of claim 11, further comprising receiving a direct power current from an electrical power supply package comprising a battery, and using the direct power current to power a logic processor for processing the received inputs and sending electronic output causing the first control valve to mechanically adapt the water mixing assembly and causing the second control valve to mechanically adapt the water flow rate.

15. The method of claim 11, wherein the water flow control assembly comprises a solenoid valve and a motorized gear valve, wherein the solenoid valve is configured to toggle the valve on and off in order to start and stop water flow to the spout, and the motorized gear valve is configured to adjust the flow of the mixed water to the spout.

16. The method of claim 11, wherein the temperature flow control assembly comprises a motorized gear valve.

17. The method of claim 11, wherein the second sensor and third sensor are both embedded within a separate compartment that is physically distinct from the spout.

18. The method of claim 11, wherein the spout comprises a planar spout face with a water outlet, and wherein the first sensor is embedded within the planar spout face.

19. The method of claim 11, wherein the spout comprises a spout shaft that channels the mixed water output by the second control valve, and wherein the first sensor is embedded within the base of the spout shaft.

20. The method of claim 19, wherein the spout shaft is substantially cylindrical.

21. The method of claim 11, wherein each input is received by the same digital logic processor.

* * * * *